United States Patent [19]

Long et al.

[11] Patent Number: 4,829,455
[45] Date of Patent: May 9, 1989

[54] GRAPHICS SYSTEM FOR VIDEO AND PRINTED IMAGES

[75] Inventors: Robert J. Long, Didcot; Alan L. Stapleton, Newbury, both of Great Britain

[73] Assignee: Quantel Limited, Kenley, Great Britain

[21] Appl. No.: 30,881

[22] Filed: Mar. 26, 1987

[30] Foreign Application Priority Data

Apr. 11, 1986 [GB] United Kingdom ............... 8608916
Jun. 25, 1986 [GB] United Kingdom ............... 8615458

[51] Int. Cl.⁴ ............................................. G09G 1/16
[52] U.S. Cl. ................................. 364/521; 340/703; 340/723; 340/798
[58] Field of Search ............... 364/518, 521; 340/703, 340/727, 798-800, 723

[56] References Cited

U.S. PATENT DOCUMENTS

| | | | |
|---|---|---|---|
| 4,475,161 | 10/1984 | Stock | 364/521 |
| 4,490,797 | 12/1984 | Staggs et al. | 340/703 |
| 4,514,818 | 4/1985 | Walker | 364/521 |
| 4,564,915 | 1/1986 | Evans et al. | 364/521 |
| 4,633,416 | 12/1986 | Walker | 364/521 |
| 4,648,028 | 3/1987 | DeKlotz et al. | 364/521 X |
| 4,710,806 | 12/1987 | Iwai et al. | 364/521 X |

FOREIGN PATENT DOCUMENTS

A10177146 8/1985 European Pat. Off. .
2089625 12/1980 United Kingdom .
2140257A 12/1981 United Kingdom .

Primary Examiner—Gary V. Harkcom
Assistant Examiner—H. R. Herndon
Attorney, Agent, or Firm—Cooper & Dunham

[57] ABSTRACT

A graphic system for producing printed images. The signals representing the image are produced as CMY (cyan, magenta, yellow) printing color component signals and transformed to RGB (red, green, blue) signals for display on a monitor. The transformation circuit is a matrix of arithmetic circuits including look-up tables. The system can also be conditioned so that RGB signals are first produced and these transformed to CMY.

20 Claims, 2 Drawing Sheets

MATRIX 23

GRAPHICS SYSTEM FOR VIDEO AND PRINTED IMAGES

This invention relates to electronic graphic systems.

In our British Pat. Nos. 2089625 and 2140257 (corresponding to U.S. Pat. Nos. 4,514,818 and 4,633,416, respectively) a graphic system is described in which painting of a color picture can be simulated by electronic means. The system includes a so called palette store for signal components representing a range of colors, and a stylus/touch tablet device by which the artist can designate points or strokes on the picture. The artist selects signal components representing a desired color from the palette, and moves the stylus to points on the touch tablet corresponding to points on the picture to which the selected color is to be applied. The stylus/touch tablet device generates signals representing the brush stamps at points designated by the stylus and these signals are translated into addresses in a frame store for video signals, the signals representing the color being written in the said addresses. The artist may also adjust the intensity of the signals applied to the frame store. By selecting different colors and intensities for different brush stamps or strokes designated on the touch tablet, the artist can build up in the picture store a sequence of video signals representing a desired picture and this picture can be viewed on a TV type color monitor. It can also, if desired, be transmitted by television or reproduced in some other way, as by color printing on paper in response to the stored signals. The picture can be created with the definition needed for its end use, e.g. television or printing.

Printing the picture would normally involve the use of printing inks which are respectively red-absorbing (cyan), green-absorbing (magenta) and blue-absorbing (yellow). The cyan ink is applied to the paper by printing plates formed with dots which vary in size as a function of the amount of red light to be reflected from the paper. The magenta and yellow inks similarly vary the reflections of green and blue light. As distinct from this color printing, on the image displayed on a TV type monitor, the color of any picture point is determined by the proportion of red, green and blue light produced by the respective phosphors. The relationship between the TV monitor colors RGB and the dot areas on the different printing plates is non-linear and there is also a substantial range of colors which can be displayed by the monitor but which cannot be reproduced by the usual printing inks. Therefore the picture created by the artist, when reproduced by printing, may not correspond as closely as would be desirable to that displayed during the creation of the picture.

In published European Patent Specification No. A1 0 177 146, there is described a system for electronically retouching an image. The system comprises a disc store for printing color component image signals derived, say, by scanning a color print. Signals derived from the store are applied to a monitor via a color converter which converts the printing color component signals to monitor format color component signals, namely red, green and blue components. The image is displayed on a monitor portion of the screen. Digital printing color component values representing a spectrum of colors are stored in a separate memory and these values, converted by the color converter, can be displayed as a spectrum of colors in a window portion of the monitor screen. The operator is able to modify the displayed spectrum of colors in the window portion and while observing the image in the monitor portion, select one of the colors in the displayed spectrum. The operator can then replace the color component image signals in a part of the image stored in the disc store by color component image signals of the selected spectrum color.

This specification does not, however, deal with systems for simulating the painting of color pictures by electronic means in which the artist depends on being able to continuously observe the effect of this work as it progresses.

The object of the invention is to reduce the difficulty referred to in the preceding paragraph and other difficulties which arise due to the need to use additive and subtractive primary colors at different points in the system.

In accordance with the present invention there is provided a graphic system comprising;

(a) operator controlled palette means for providing color component signals representing a color selected by the operator, (b) a frame store having storage locations for storing color component signals for different picture point in an image, (c) graphic means including a movable drafting tool for designating operator—selected image point in an image at which the selected color is to be applied to build up the image.

(d) processing means for deriving color component image signals responsive to the color component signals provided by said palette means and for storing said derived color component signals at storage locations in said framestore corresponding to the image points designated by said graphic means, (e) monitor means employing additive mixing of color components for displaying an image of signals stored in said storage means, (f) said palette means being arranged to provide color component signals representing subtractive primary components of the selected color, and (g) transforming means are provided for feeding color component signals from said framestore to said monitor means, said transforming means being arranged to transform the respective color component signals from said subtractive primary components to the corresponding additive primary components whereby the image signals stored in said frame can be used to produce by printing the image displayed on said monitor.

The system may be such as to produce three printing signals for determining dot areas for the respective printing plates for cyan (c), magenta (M) and yellow (Y) printing inks, while the transforming means is arranged to transform these signals to RGB signal for the monitor. This allows the artist to paint directly in CMY and store such data at maximum precision.

The present invention also provides a preferred transforming means comprising a matrix of n ×n arithmetic units, where n>3, means inputting to each n>3 row of the matrix signals representing one color in a set of primary colors, and means for adding the outputs column by column to produce the desired transformed signals. Each arithmetic unit includes a look-up table which can be used to load the respective unit with a co-efficient and/or a function (for example logarithm) of the input.

For example, on transforming from CMY to RGB, multiplying transforms are required, and these are achieved by converting the inputs to logarithms, adding the logarithms, multiplied by respective co-efficients in the arithmetic units, and converting the resultants to anti logarithms.

Although the transforming means is described as transforming from CMY to RGB, it can perform other transformations, for example the inverse transform RGB to CMY, or linear transforms such as RGB to YUV as used in television systems. The transforming means may also be conditioned by suitably loading the arithmetic units to transmit the input straight through, without transformation.

In order that the present invention may be more clearly understood and readily carried into effect, it will now be more fully described with reference to the accompanying drawing in which.

Figure 1:
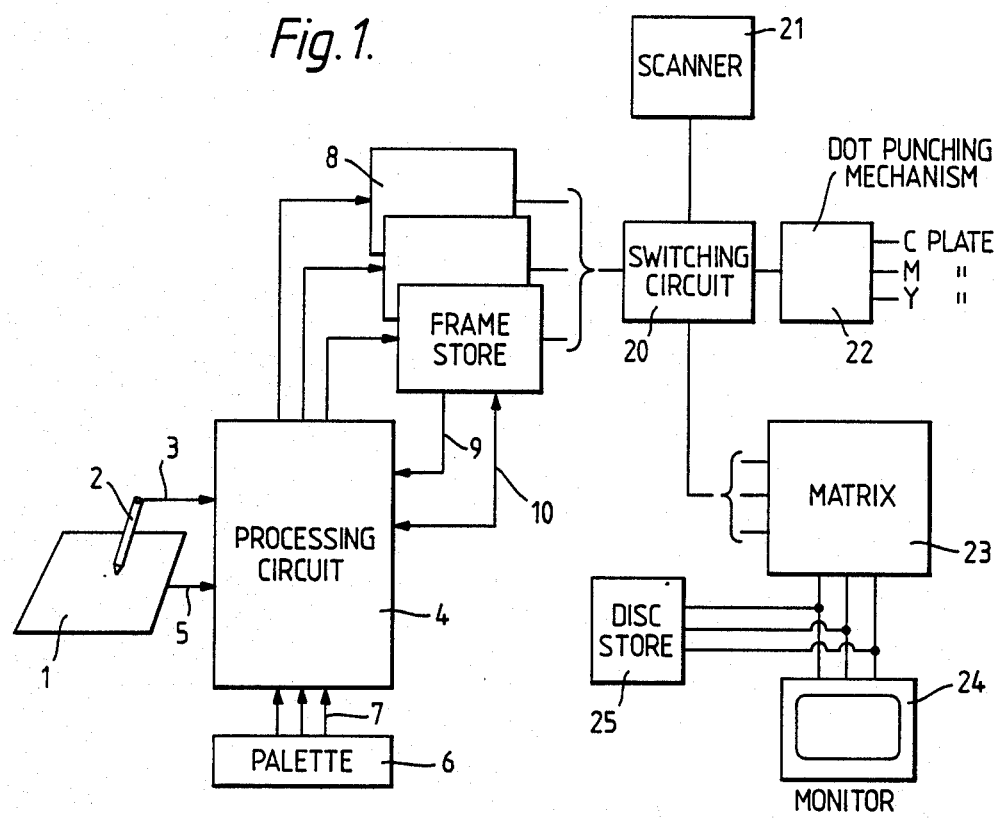
FIG. 1 is a block diagram of one example of a graphic system according to the invention.

Referring to the drawings, the graphic system illustrated is shown only in outline and references 1 and 2 denote the touch tablet and stylus which the artist uses to create the picture. As the artist moves the stylus 1 over the touch tablet, a signal representing pressure on the stylus is applied via a path 3 to a signal processing circuit 4. Signals representing the co-ordinates on the touch tablet of successive positions of the stylus as it moves are applied via a path 5 to the processor 4. Reference 6 represents a palette store, which can be used by the artist to select the color which he wishes to have applied to points on the picture designated by the stylus on the touch tablet. When a color is selected, voltages representing the components of the color (at a predetermined amplitude) are applied to the processor via path 7. The processor 4 is of the kind described in our Pat. Nos. 2089625 and 2140257 (corresponding to U.S. Pat. Nos. 4,514,818 and 4,633,416, respectively) and will not be described in detail in this application. It is sufficient to say that, as the artist designates points on the picture he is creating, using the stylus and touch tablet, the component signals representing the selected color, provided by the palette store 6 are applied to addresses corresponding to the designated points in three color planes of a frame store 8. When the component signals are applied to a particular address in the store 8, they are blended with any previous color component signals which may be already stored at the address, as described in our aforesaid patents, the previous signal being read back to the processor via path 9 to take part in the blending process. Reading and writing are controlled from the processing circuit 4 via the path 10. Before blending the component signals from the palette store 6 with the previous signals from the store 8, the amplitude of the component signals and thus the blending may be modified by the pressure signal from the stylus 2.

The component signals may also be selectively controlled in amplitude to represent the distributing power of the 'brush', as described in our aforesaid patents. It will be appreciated that the color signals are in digital form, so that the stores 6 and 8 and the processing circuit 4 are digital circuits.

As shown in FIG. 1 signals read from the store 8, are applied to a switching circuit 20 which is also connected to receive signals from print scanner means 21. The circuit 20 has one output to mechanism 22 for producing printing plates for respectively the C, M and Y inks of a color printing processor. It has another output of three component signals which leads to a transforming matrix 23, the outputs of which go to TV monitor 24 and also to disc store 25 or other long term storage means. The matrix 23 is set up to transform CMY inputs to RGB inputs.

During the creation of the picture by the artist the signals written in the frame store 8 are read continuously sequentially and applied by the switching circuit 20 to the matrix 23 and after transformation from CMY to RGB are applied to the monitor 24, where the artist can monitor the effect of his painting as it proceeds. After the creation of the picture is complete, to print the picture, the switching circuit is arranged to feed the component signals from the different frame stores to the dot printing mechanism to control the formation of dots in the printing plates for respectively CMY inks. The picture is ultimately printed by superimposed printing with the different inks using the respective plates. It must be understood that the store 8 will have sufficient storage locations for the definition needed in picture, and the processing circuit must also operate with adequate definition.

Figure 2:
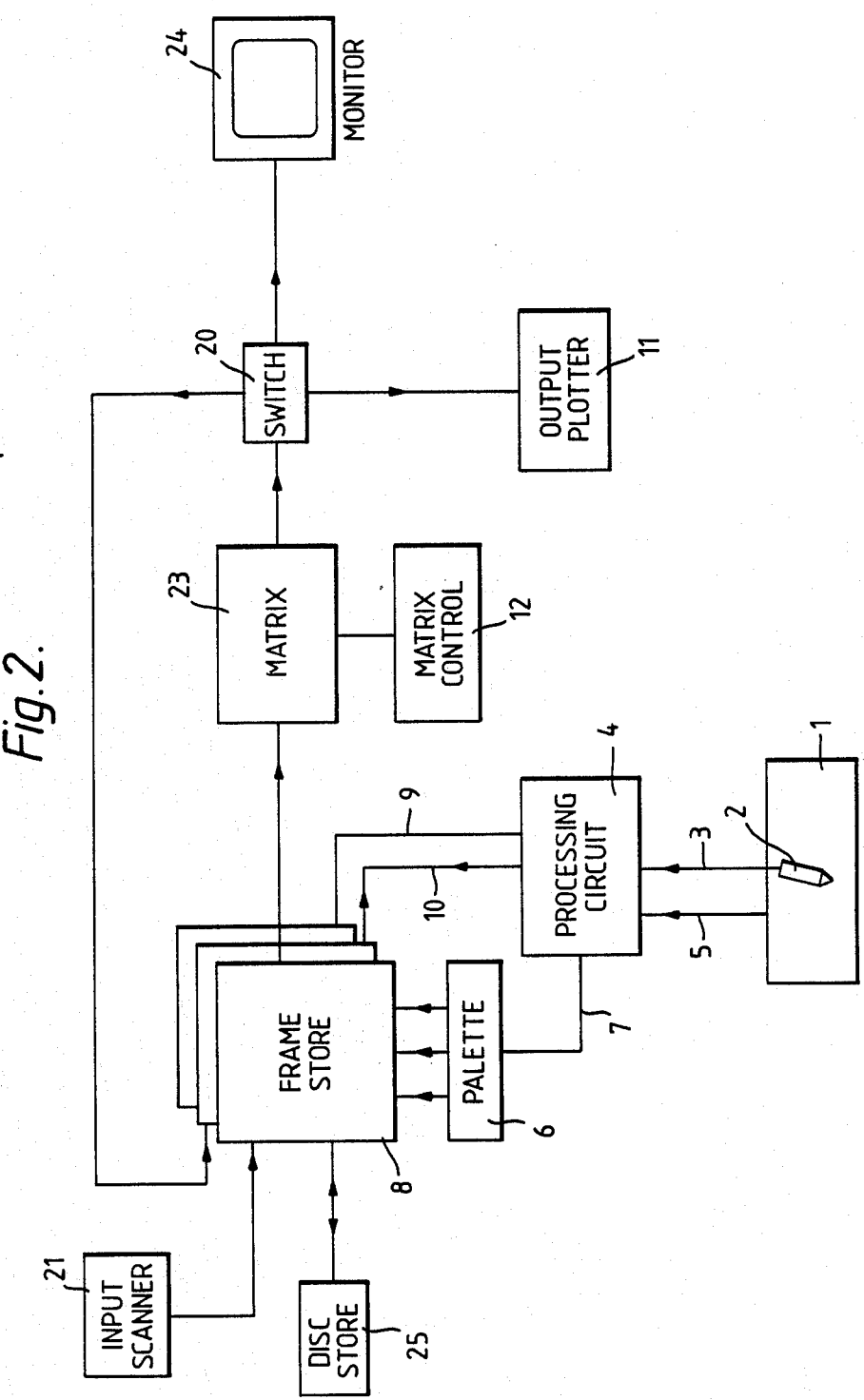
FIG. 2 is a block diagram of a second example of a graphic system according to the invention.

In an alternative embodiment shown in FIG. 2, frame store 8 can also receive an input from scanner 21, which may for example be a HDTV camera, and disc store 25. Components which are common to both the FIG. 1 and FIG. 2 embodiments are denoted by the same reference numbers. These signals and those produced in the processing circuit may be any suitable color component signals such as RGB, or the cyan, magenta and yellow of the printing process.

Dependent on the type of signals in frame store 8 and the output for these signals the signals are read from the frame store and transformed in matrix 23. After transformation the signals are switched by switch 20 to the output required. The outputs are the monitor 24, the output plotter 11 and the frame store 8. If the signals are to be displayed on the monitor they should be RGB signals and the signals to output plotter 11 should be C, M, Y.

Consider the case when the signals stored in frame store 8 are C, M, Y color component signals and the artist wishes to monitor the effect of his painting as it proceeds. Matrix control 12 ensures that the matrix acts to transform the C, M, Y signals to R, G, B signals and switch 20 switches the output of the matrix to the monitor. When the creation of the picture is complete and when printing is desired the matrix control 12 sends a control signal to the matrix which then acts to allow the C, M, Y signals to pass through without transformation. Switch 20 switches the output to plotter 11 which may be of any known type either continuous tone or half tone.

When RGB or other signals are used the matrix will, prior to printing, transform these signals to C, M, Y. The feedback from the matrix to frame store 8 allows the contents of the store to be transformed from one type of signal to another and to be re-stored as the transformed signal. The signal in the store can be transferred to the disc store 25. As an example of the use of the feedback path, if the signals were stored in frame store 8 as C, M, Y signals and the disc store was to be used to store RGB signals then the signals could be read from the frame store, transformed in matrix 23 and written back into the frame store before being transferred to the disc store 25. It must be understood that the store 8 will have sufficient storage locations for the definition needed in picture, and the processing circuit must also operate with adequate definition.

By virtue of the provision of the matrix 23 the colors which are produced by the printing inks correspond very closely to those observed by the artist on the monitor 24 during the creation of the picture. The artist is thus allowed to paint directly in CMY without knowing it, and the CMY data is produced at maximum resolution. The component signals stored in the palette store 6 will have the effect of CMY components when selected by the artist, and he can observe the color represented by a particular choice of component signals on the monitor 24. This color would in general differ from that produced if the component signals are used as RGB signals.

Figure 3:
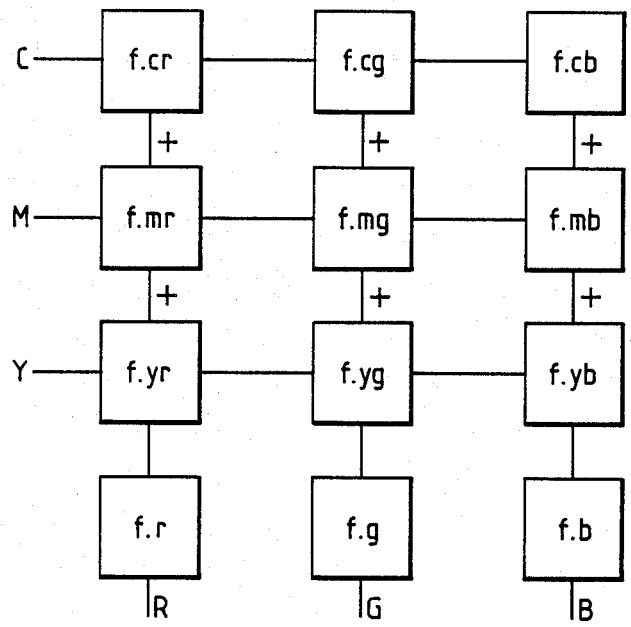
FIG. 3 is a block diagram of the transforming matrix included in the system illustrated in FIGS. 1 and 2.

A suitable form of the transform matrix 23 is shown in FIG. 3. It comprises a 3×3 matrix of arithmetic units represented by the functional notation f.cr f.mr etc. The units of the matrix as shown in FIG. 3 have 8 bits in and 12 bits out but this is not mandatory and look up tables for storing a range of co-efficients by which the input or a function of the input can be multiplied. In the present example, the look up tables are arranged to store the logarithms of possible inputs. The same input is applied to each of the three units in a row and in these cases the input come respectively from the color component planes of the store 8. The outputs of the arithmetic units are added column by column as indicated and are fed out via output arithmetic units f.r f.g f.b respectively. The output units allow the user to scale the 3×3 tables to give maximum accuracy compatible with overflow possibilities and then scaling the results with appropriate rounding off and zero effect.

In one mode of operation of the graphic system described above, the matrix 23 is as stated set up to transform CMY to RGB. The theoretical transforms between CMY and the TV monitor RGB is:

$R$ percentage = 100 − $C$ percentage $G$ percentage = 100 − $M$ percentage $B$ percentage = 100 − $Y$ percentage In practice, the inks conform much less closely to the ideal than TV monitor colors. The matrix is therefore set up to convert the ink dot areas, assumed proportional to the signals stored in the frame store 8 when the picture is complete, to the monitor RGB signals which will give the same effect as the inks when applied. Thus, in principle, the artist unknowingly compensates for the imperfection of the inks while creating the signal voltages. The setting up is based on the assumption, in the case of red, that red reflection from the picture is given by:

(inverted cyan dot) $^{a.cr}$ multiplied by (inverted magenta dot) $^{a.mr}$ multiplied by (inverted yellow dot) $^{a.yr}$ and similarly for green and blue reflection. It is to be understood that:

inverted dot % = 100 − dot %

The co-efficients a for each transform lie in the range 0 to 1 and are determined empirically by measuring monitor voltages for colored wedges of measured dot area. To determine the co-efficients the monitor inputs are modified to give a match to the printed result, matched visually or by photometric measurement. The matrix 23 produces the appropriate transform by operation in the logarithmic domain in the arithmetic units, adding the outputs in columns and taking the antilogarithms of the results.

Allowance may be made for the fact that inks are not perfect absorbers, i.e. 100% dot area does not give zero reflection. Such allowance may be made be reducing the range of ink dot areas, say from 0% to 95% by putting in a gain change in the ink values and the corresponding RGB values. Furthermore it is convenient to separate the basic color transformation needed to set ink primaries right from the transformation needed to get neutral greys to stay neutral. To achieve this result, all co-efficients a.cr etc. are normalised so that equal CMY gives equal RGB whilst adjusting the co-efficients to give the right ink primaries on the monitor. Also, different gradations are put in the middle range of RG and B to give the empirically observed off-neutral grey scale when CMY are equal.

The system illustrated in FIG. 1 or FIG. 2 allows the picture created by the artist and stored in the store 8 to be transferred to the long term store 25. Signals from the scanner 21 can be similarly transferred. Since the transfer in each case, as represented, takes place via the matrix 23, the picture is stored in RGB. If subsequently it is required to transfer the picture back to the dot forming mechanism 22, it should be passed again through the matrix 23, set up however to produce the inverse transform RGB to CMY. In yet another alternative mode of operation the matrix 23 can be set up to be transparent, so that the graphic system would 'paint' in RGB, for example, if required for HDTV operation. For other modes of operation the matrix may be set up to produce linear transforms, such as YUV (Y=luminance) to RGB or vice versa. A wide selection of operational modes can be achieved by suitable arrangement of the switching circuit 23 in connection with the components 8, 21, 22, 23 and 25.

When producing inverse transforms such as RGB to CMY, the transformation may produce 'illegal' values of CMY representing colors outside the gamut of the printing primaries. To reduce this effect, the matrix may be set to limit the outputs when such illegal values are liable to arise.

We claim:
1. A graphic system comprising:
   (a) operator controlled palette means for providing color component signals representing a color selected by the operator;
   (b) a frame store having storage locations for storing color component signals for different picture points in an image;
   (c) graphic means including a movable drafting tool for designating operator-selected image points in an image at which the selected color is to be applied to build up the image;

(d) processing means for deriving color component image signals responsive to the color component signals provided by said palette means and for storing said derived color component signals at storage locations in said framestore corresponding to the image points designated by said graphic means;

(e) monitor means employing additive mixing of color components for displaying an image of signals stored in said storage means;

(f) said palette means being arranged to provide color component signals representing subtractive primary components of the selected color; and (g) transforming means being provided for feeding color component signals from said framestore to said monitor means, said transforming means being arranged to transform the respective color component signals from said subtractive primary components to the corresponding additive primary components whereby the image signals stored in said framestore can be used to produce by printing the image displayed on said monitor.

2. A graphic system according to claim 1 wherein said monitor means employs RGB color components and said transforming means is arranged to transform CYM color component signals to RGB color component signals.

3. A system according to claim 1 including switch means for switching the mode of operation of the system so that said framestore receives image signals which are additive primary component signals and said transforming means transforms the color components signals from the framestore from additive primary components to subtractive primary components.

4. A system according to claim 3 comprising an output plotter arranged in said switched mode of operation of the system, to receive the subtractive primary component signals from said transforming circuit.

5. A system according to claim 3 wherein said transforming means comprises a matrix of look-up tables, the contents of which can be switched by said switching means.

6. A system according to claim 1 including switching means for switching the mode of operation of said system so that said transforming means is rendered ineffective, and comprising an output plotter which is arranged, in said switched mode of operation of the system, to receive the color component signals from said framestore without transformation.

7. A system according to claim 6 wherein said transforming means comprises a matrix of look-up table, the contents of which can be switched by said switching means.

8. A system according to claim 1 including switching means for switching the mode of operation of said system so as to include said transforming circuit in a path from the output to the input of said framestore, whereby said system can be arranged to transform any signals in said framestore from subtractive primary components to additive primary components, or vice versa.

9. A system according to claim 8 wherein said transforming means comprises a matrix of look-up tables, the contents of which can be switched by said switching means.

10. A transforming circuit for a color graphic system for transforming subtractive color component signals to additive color component signals or vice versa, comprising a matrix of arithmetic units having a row of such units for each component signal of an input to the circuit, the number of units in each row being the number of component signals in the output of the circuit, means for applying component signals input to the circuit each to the respective row of units in series, and means for deriving the component signals of the output from the circuit each from a respective column of the units, and the arithmetic units being responsive to the respective input component signals to produce predetermined signal contributions to the output component signals.

11. A transforming circuit according to claim 10, wherein said arithmetic units are look up tables, the contents of which can be switched to provide selectively a subtractive-to-additive primary transformation, or a additive-to-subtractive primary transformation.

12. A transforming circuit according to claim 10, wherein said arithmetic units are arranged to produce contributions to the output component signals which are logarithmic functions of the respective input component signals, and means are provided for taking antilogarithms of the sum of the contributions from each column of the arithmetic units.

13. A video graphics system comprising:
a framestore for storing a digitized color image in print format;
a transformation circuit comprising a forward transformer coupled to the framestore to receive the print format image therefrom and in response to provide a corresponding television format color image;
a monitor coupled to the transformation circuit to receive therefrom and display in color said television format image;
an entry system for producing image modifying signals in print format;
a processor responsive to said image modifying signals to combine them in print format with any print format image already stored in the framestore to thereby modify the stored print format image; and
a printer selectively coupled to the framestore to receive therefrom and print the print format image stored therein;
wherein an artist through the entry system can create or modify an image directly in print format while observing in real time on the monitor a television format version of the image.

14. A video graphics system as in claim 13 including means for generating an external image in television format, and in which (i) the transforming circuit includes a reverse transformer coupled to the means for generating to selectively receive therefrom said external image in television format and in response to provide a corresponding external image in print format, and (ii) the processor includes means for selectively combining in print format said print format external image with any print format image already stored in the framestore to thereby modify the print format image stored in the framestore.

15. A video graphics system as in claim 14 wherein said means for generating an external image in television format comprises at least one of an image scanner and an image store.

16. A video graphics system as in claim 13 in which the print format image comprises cyan, magenta and yellow components and the transformation circuit comprises a matrix circuit receiving the print format image components and providing a color television format image in a selected television format.

17. A video graphics system as in claim 16 in which the color television format image is RGB format.

18. A video graphics system as in claim 13 in which the transformation circuit comprises a matrix of arithmetic units each of which includes a lookup table storing values of image data in one of the print and television formats addressable by image data in the other one of said formats.

19. A video graphics system as in claim 18 in which the contents of said lookup tables are selectively switchable to thereby selectively cause said matrix to operate as said forward transformer and as said reverse transformer.

20. A video graphics system as in claim 18 in which each arithmetic unit receives input values related to image data to be converted from an input format to an output format and produces output values which are logarithmically related to the respective input values, and the transforming circuit includes means for summing the outputs of respective arithmetic units and for providing outputs which are anti-logarithmically related to the respective sums.

* * * * *